US008799722B2

(12) United States Patent  
Neuhaus et al.

(10) Patent No.: US 8,799,722 B2  
(45) Date of Patent: Aug. 5, 2014

(54) BUSINESS TO BUSINESS NETWORK MANAGEMENT EVENT DETECTION AND RESPONSE SYSTEM AND METHOD

(71) Applicant: Metavante Corporation, Jacksonville, FL (US)

(72) Inventors: Scott E. Neuhaus, Jacsonville, FL (US); Scott D. Swessel, Portland, OR (US); Alexander A. Senkevitch, North Prairie, WI (US)

(73) Assignee: Metavante Corporation, Jacksonville, FL (US)

( * ) Notice: Subject to any disclaimer, the term of this patent is extended or adjusted under 35 U.S.C. 154(b) by 0 days.

(21) Appl. No.: 13/671,967

(22) Filed: Nov. 8, 2012

(65) Prior Publication Data  
US 2013/0073913 A1    Mar. 21, 2013

Related U.S. Application Data

(63) Continuation of application No. 10/357,433, filed on Feb. 3, 2003, now Pat. No. 8,332,502, which is a continuation-in-part of application No. 09/930,684, filed on Aug. 15, 2001, now abandoned.

(51) Int. Cl.  
G06F 11/07 (2006.01)

(52) U.S. Cl.  
USPC .......................................................... 714/48

(58) Field of Classification Search  
USPC ........................................................ 709/224  
See application file for complete search history.

(56) References Cited

U.S. PATENT DOCUMENTS

| | | |
|---|---|---|
| 4,918,623 A | 4/1990 | Lockitt et al. |
| 4,951,196 A | 8/1990 | Jackson |
| 5,278,901 A | 1/1994 | Shieh et al. |
| 5,414,833 A | 5/1995 | Hershey et al. |
| 5,471,194 A | 11/1995 | Guscott |
| 5,548,751 A | 8/1996 | Ryu et al. |
| 5,557,780 A | 9/1996 | Edwards et al. |
| 5,586,277 A | 12/1996 | Brown et al. |
| 5,608,874 A | 3/1997 | Ogawa et al. |
| 5,644,762 A | 7/1997 | Soeder |
| 5,778,359 A | 7/1998 | Stent |
| 5,796,942 A | 8/1998 | Esbensen |
| 5,822,778 A | 10/1998 | Dutton et al. |
| 5,856,931 A | 1/1999 | McCasland |
| 5,897,633 A | 4/1999 | Nolan |
| 5,919,257 A | 7/1999 | Trostle |

(Continued)

OTHER PUBLICATIONS

"How to create a DMZ Network with Proxy Server 2.0", Microsoft Product Support Services, Article ID Q191146, May 10, 2001, pp. 1-3.

(Continued)

*Primary Examiner* — Sulaiman Nooristany  
(74) *Attorney, Agent, or Firm* — Finnegan, Henderson, Farabow, Garrett & Dunner, LLP

(57) ABSTRACT

A network management system includes an automatic reconnaissance (resolution) component which, in one embodiment, includes four main operational components, namely a real-time parse/analysis component, a data merge component, a data analysis component, and a response capability component. These four components interact to provide real-time event recognition and response. The network management system efficiently receives, parses, and comprehends a large amount of event and statistical data that could be indicative of a network systems operation failure with resultant response actions initiated through such an infrastructure improving mean time to recovery.

16 Claims, 11 Drawing Sheets

(56) References Cited

U.S. PATENT DOCUMENTS

| | | |
|---|---|---|
| 5,951,640 A | 9/1999 | Laura |
| 5,991,881 A | 11/1999 | Conklin et al. |
| 6,052,448 A | 4/2000 | Janning |
| 6,058,413 A | 5/2000 | Flores et al. |
| 6,134,664 A | 10/2000 | Walker |
| 6,192,370 B1 | 2/2001 | Primsch |
| 6,202,158 B1 | 3/2001 | Urano et al. |
| 6,212,525 B1 | 4/2001 | Guha |
| 6,216,203 B1 | 4/2001 | Yamaguchi |
| 6,233,191 B1 | 5/2001 | Gould et al. |
| 6,233,582 B1 | 5/2001 | Traversat et al. |
| 6,269,330 B1 | 7/2001 | Cidon et al. |
| 6,446,200 B1 * | 9/2002 | Ball et al. .................. 713/1 |
| 6,502,131 B1 | 12/2002 | Vaid et al. |
| 6,542,593 B1 * | 4/2003 | Bowman-Amuah ..... 379/201.03 |
| 6,658,465 B1 | 12/2003 | Touboul |
| 6,738,813 B1 | 5/2004 | Reichman |
| 6,751,662 B1 | 6/2004 | Natarajan et al. |
| 6,813,634 B1 * | 11/2004 | Ahmed .................. 709/224 |
| 6,928,471 B2 | 8/2005 | Pabari et al. |
| 6,970,924 B1 | 11/2005 | Chu et al. |
| 7,024,468 B1 | 4/2006 | Meyer et al. |
| 7,099,940 B2 | 8/2006 | Givoly |
| 7,167,860 B1 | 1/2007 | Black et al. |
| 7,225,250 B1 | 5/2007 | Harrop |
| 7,293,083 B1 | 11/2007 | Ranous et al. |
| 2002/0152301 A1 | 10/2002 | Garrett et al. |
| 2002/0174207 A1 | 11/2002 | Battou |
| 2003/0126256 A1 | 7/2003 | Cruickshank et al. |

OTHER PUBLICATIONS

"DMZ Support Provides Secure Configuration for Multiple NICs", Service Strategies, Inc., DMZ Isolated Networks, "Guardian NT Firewall", NT Firewall Software, May 10, 2001, pp. 1-2, and 1-3.

Northcutt, Stephen. Novak, Judy. McLachlan, Donald. "Network Intrusion Detection: An Analyst's Handbook", Sep. 2000, pp. 173-199, Second Edition, New Riders Publishing, U.S.

"Shadow: Step-by-Step Intrusion Detection using TCPdump", http://www.nswc.navy.mil/ISSEC/CID, pp. 1-31.

Building a Network Monitoring and Analysis Capability: Step by Step, Eight Steps to a Working Intrusion Detection System, The SANS Institute, Aug. 3, 2001: Version 1.1.5 980701, pp. 1-25.

Denton, Chad, "Internet Security Suites: Firewalls Keep Internet Intruders Off Your PC", PC Today.com Supersite, Reviews, Jul. 2000, pp. 106, Sandhills Publishing Company.

Denton, Chad, Tiny Personal Firewall: Huge Protection, Affordable Price, PC Today.com Supersite, Software Reviews, Mar. 2001, pp. 1-2, Sandhills Publishing Company.

Hulme, George V., "Centralized Security Management on the Way: Offerings from ISS and Symantec Help Companies Monitor Security from a Single System", Informationweek.com, May 28, 2001, p. 26.

* cited by examiner

```
C:\WINNT\System32\...

rvices.com;mvcInterfaceStatusU2;IfCheckStatus;mtrIfDown;IfDown
32;Serial0/0.428;1
01/23/2003 10:13:55 Thu;2014862;Major;CISCO-ROUTER-9.x-MIB;xjp03
rvices.com;mvcInterfaceStatusU2;IfCheckStatus;mtrIfDown;IfDown
32;Serial0/0.246;1
01/23/2003 11:45:57 Thu;2017215;Major;CISCO-ROUTER-9.x-MIB;xjp
rvices.com;mvcInterfaceStatusU2;IfCheckStatus;mtrIfDown;IfDown
32;Serial0/0.1;1
01/23/2003 11:45:58 Thu;2017216;Major;CISCO-ROUTER-9.x-MIB;xjp
rvices.com;mvcInterfaceStatusU2;IfCheckStatus;mtrIfDown;IfDown
32;Serial0/0.2;1
01/23/2003 11:46:00 Thu;2017218;Major;CISCO-ROUTER-9.x-MIB;xjp
rvices.com;mvcInterfaceStatusU2;IfCheckStatus;mtrIfDown;IfDown
2;Serial0/0;1
01/23/2003 12:06:26 Thu;2017743;Major;CISCO-ROUTER-9.x-MIB;xjp
rvices.com;mvcInterfaceStatusU2;IfCheckStatus;mtrIfDown;IfDown
2;Serial0/0;1
01/23/2003 12:24:36 Thu;2018210;Major;CISCO-ROUTER-9.x-MIB;xjp
rvices.com;mvcInterfaceStatusU2;IfCheckStatus;mtrIfDown;IfDown
32;Serial0/0.1;1
01/23/2003 12:26:21 Thu;2018257;Major;CISCO-ROUTER-9.x-MIB;xjp
rvices.com;mvcInterfaceStatusU2;IfCheckStatus;mtrIfDown;IfDown
32;Serial0/0.2;1
01/23/2003 12:26:28 Thu;2044429;Major;CISCO-ROUTER-9.x-MIB;xjp9
vices.com;mvcInterfaceStatusU2;IfCheckStatus;mtrIfDown;IfDown;
;Serial0/0;1
01/23/2003 12:32:38 Thu;2018419;Major;CISCO-ROUTER-9.x-MIB;xjp
rvices.com;mvcInterfaceStatusU2;IfCheckStatus;mtrIfDown;IfDown
32;Serial0/0.2;1
01/23/2003 12:32:40 Thu;2018420;Major;CISCO-ROUTER-9.x-MIB;xjp
-- More -- (82%)
```

FIG. 6

BUSINESS TO BUSINESS NETWORK MANAGEMENT EVENT DETECTION AND RESPONSE SYSTEM AND METHOD

RELATED APPLICATIONS

This is a continuation of application Ser. No. 10/357,433 filed Feb. 3, 2003, (Allowed) which is a continuation-in-part of application Ser. No. 09/930,684, which was filed on Aug. 15, 2001, both of which are incorporated herein by reference in their entireties.

BACKGROUND OF THE INVENTION

Field of the Invention

The present invention relates generally to network management monitoring systems, and more particularly, to a real time business to business network management system and method.

Many businesses that are required to employ networked systems must rely on outside carriers or vendors to provide network data services, such as providing and maintaining communication links between one or more facilities. One example is financial institutions, such as banks, credit unions and the like. Network reliability is an important consideration in such businesses. Any outage can mean financial loss for the business as well as loss of customers. Even the most reliable networks require regular troubleshooting. It is imperative to minimize the amount of time needed to accurately identify and report customer network problems.

Accordingly, managed data networks are monitored continuously to detect the occurrence of faults and as soon as a network fault is detected, corrective action is taken. A short coming of network management systems currently in use is that manual intervention is required in some part of the solution to a network problem that has been detected. More specifically, upon detection of a network fault in a managed network, network management systems currently in use require manual intervention to provide alarm information to the appropriate carrier or vendor. Basic information related to the event is generally provided to the vendor by telephone or through web-based electronic maintenance tools to report outages. This requires re-entry of data into the vendor/carrier web-based reporting system. The vendor then uses the data supplied by operations personnel of the network management system to identify a faulty component, site etc. prior to beginning to diagnose the problem. Only then can the vendor initiate trouble shooting and/or testing to obtain resolution.

Another consideration is that to track the progress of correcting a fault, the vendor must open a work ticket. However, creation of a work ticket requires manual intervention. The time expended in work ticket creation further increases reaction time.

Some of the information needed to correct a network fault includes the identification of the nature of the fault and the identification of the faulty component. These can be determined using hardware and software maintenance routines. However, these routines must be initiated. They can be initiated by an administrator at the financial institution or by personnel of the vendor. However, in the former case, it is necessary that the contact person be identified and alerted. In the later case, it is necessary that the vendor be made aware of the existence of a problem.

A problem that causes delay is the need to determine who the contact person is at the financial institution and obtain the contact information for that individual. This is a time consuming task.

Some vendors, such as AT&T, have created automated test and repair systems and software to speed up the maintenance of networks. These systems require manual intervention and some manual input to solve a problem.

It is accordingly the primary objective of the present invention to provide an improved network management system for business to business systems and the like.

Another objective of the present invention is to provide a network management system that provides a multi-stage analysis and response process that flows sequentially from input to output and allows resolution of problems to be achieved automatically and in a minimum of time.

A further objective of the present invention is to improve the efficiency of trouble reporting and to shorten the duration of network outages in managed network systems.

Another objective of the present invention is to decrease the amount of time needed to accurately identify and report client managed network problems.

Yet another objective of the present invention is to automate the trouble ticketing process to maximize efficiency and solve problems.

SUMMARY OF THE INVENTION

The disadvantages and limitations of the background art discussed above are overcome by the present invention. With this invention, there is provided a network management system for managing a networked system of an enterprise system.

The network management system is a multi-stage analysis and response process that flows sequentially from input to output and allows resolution of problems to be achieved automatically and in a minimum of time. The network management system has the ability to automatically diagnose trouble, issue an alarm and produce a work ticket whenever an outage is detected.

The network management system includes an automatic reconnaissance (resolution) component which, in one embodiment, includes four main operational components, namely a real-time parse/analysis component, a data merge component, a data analysis component, and a response capability component. These four components interact to provide real-time event recognition and response. The network management system efficiently receives, parses, and comprehends a large amount of event and statistical data that could be indicative of a network systems operation failure with resultant response actions initiated through such an infrastructure improving mean time to recovery.

The network management system provides analysis and response functions automatically and without any manual intervention. However, the network management system can include a network operations center to allow network operations personnel access to alarm data provided by the network management system, allowing the network operations personnel to view, interpret and respond to event messages generated by the automatic reconnaissance (resolution) component When the system detects an alarm, it automatically launches circuit testing and where appropriate, ticket creation, with no or minimal human intervention.

While the network management system is described with reference to an application for providing network management, the system can also be used in other applications, such as to oversee a computer system and indicate processors, servers, etc. that are down.

DESCRIPTION OF THE DRAWINGS

These and other advantages of the present invention are best understood with reference to the drawings, in which:

FIG. 5 is a screen shot showing the content of typical raw event data supplied to the network management system shown in FIG. 2;

FIG. 6 is a screen shot showing the content of event records after being supplemented with information by an event recognition processor of the network management system shown in FIG. 2;

DETAILED DESCRIPTION OF THE PREFERRED EMBODIMENT

Background

Figure 1:
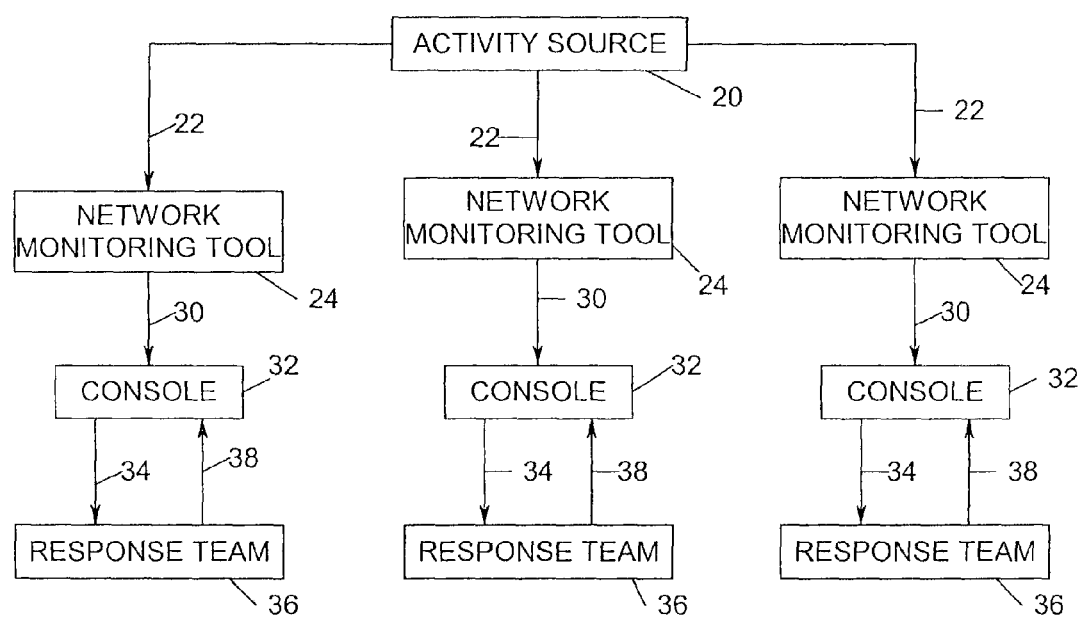
FIG. 1, which is labeled "Prior Art", is a block diagram of known network management system.

Prior to beginning a discussion of the composition and operation of the network management system of the present invention, it is useful to briefly discuss the way that current network management systems are arranged to recognize and respond to events and to maintain the integrity of an enterprise system. Referring to FIG. 1, the process presently relied upon by known network management systems is shown. As activity data clusters 22 are passed along an activity source 20, such as the global communications network, systems connected to the activity source 20 identify data clusters 22 that are directed to the system. The identified data clusters 22 are then reviewed by one or more network monitoring tools 24 to determine whether the data clusters 22 meet the criteria to be recognized as an event. When a network monitoring tool 24 identifies an event, it generates event data 30, which includes some or all of the activity data and can also include additional information about the event. If the data cluster 22 is recognized as an event, an alert 34 is sent regarding the event.

As shown in FIG. 1, more than one network monitoring tool 24 can be used in current network management systems. Each network monitoring tool 24 will detect and process its own type of event and send the event data 30 to a corresponding console 32 with the same protocol as the originating network monitoring tool 24. The console 32 then sends an alert 34 to a response team 36 associated with each network monitoring tool 24. The response team 36 must learn each network monitoring tool 24 in order to determine whether to provide an appropriate system response. In addition, the event data 30 forwarded by each network monitoring tool 24 are not aggregated within the system, but maintains its own protocol and works within a defined system environment. Further, the event data 30 are not stored for further analysis or review.

In known network management systems, event response information obtained is supplied to a carrier or vendor that provides and maintains a network portion of a client's managed network to correct the problem and/or to alert contact personnel of the client as to the presence of the problem. For example, a service provider can provide data networks for financial institutions for electronic banking, electronic payment and presentment financial account processing services. Such data networks typically require support by a carrier or vendor that provides frame relay service to an ATM data network that supports the financial accounting technology. In such application, information derived from the event response information is supplied to the carrier or vendor who translates the data into a form that allows the vendor to identify the source of the problem or translates the data into a form that allows the vendor to identify the source of the problem, enabling the vendor to initiate appropriate testing and/or maintenance of the frame relay network of the managed network system to obtain resolution of the problem.

Network Management System

Figure 2:
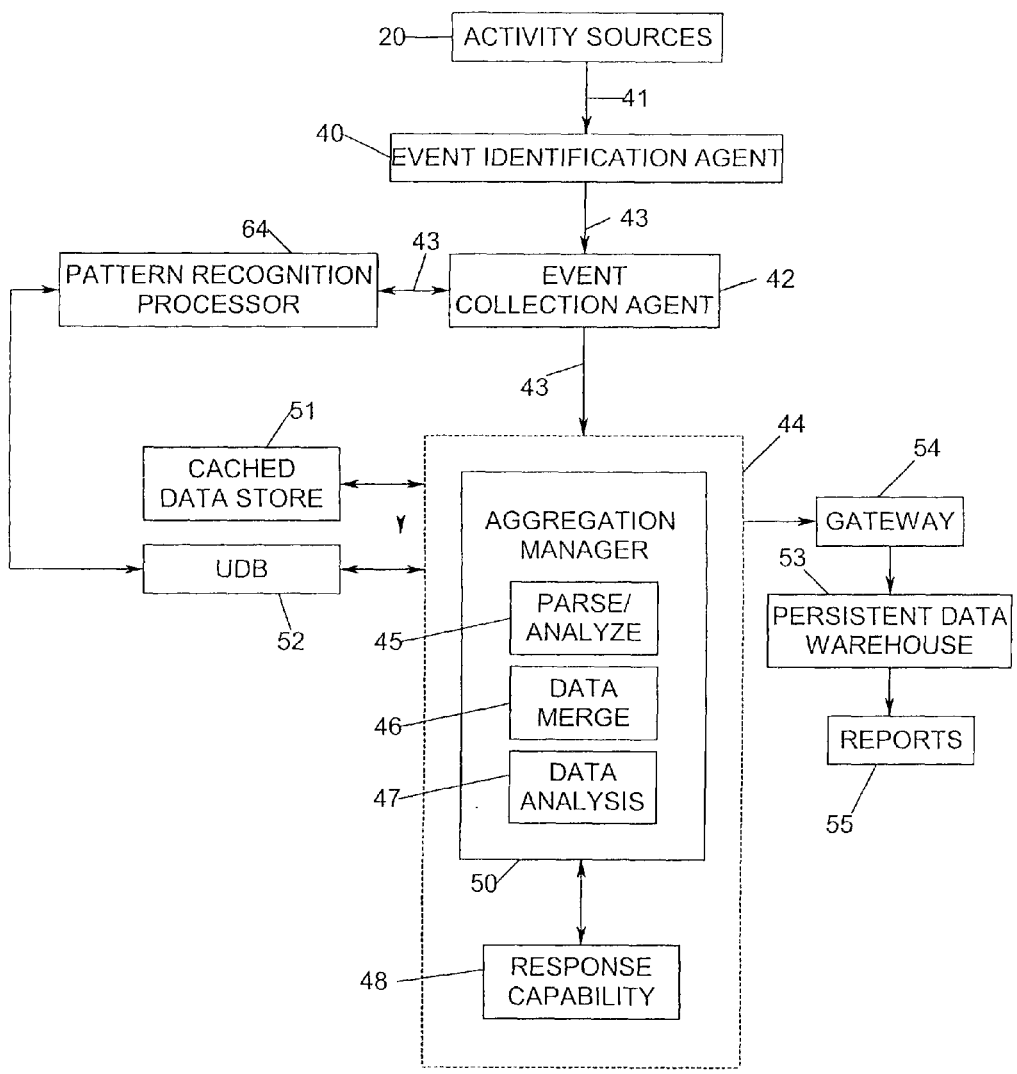
FIG. 2 is a block diagram of a network management system in accordance with the present invention.

With this background information in mind, reference is now made to FIG. 2, which is a block diagram of a network management system 38 in accordance with one embodiment of the present invention for managing a business-to-business data network of an enterprise system. The network management system 38 is a multi-stage analysis and response process that flows sequentially from input to output and allows resolution of problems to be achieved automatically and in a minimum of time. The network management system 38 has the ability to automatically diagnose trouble, issue an alarm and produce an electronic action whenever an outage is detected.

As will be shown, the network management system 38 efficiently receives, parses, and comprehends a large amount of event and statistical data that could be indicative of a network systems operation failure with resultant response actions initiated through such an infrastructure improving mean time to recovery.

The network management system 38 provides analysis and response functions automatically and without any manual intervention. However, the network management system 38 can include a network operations center to allow network operations personnel access to alarm data provided by the network management system 38, allowing the network operations personnel to view, interpret and respond to event messages generated by an automatic reconnaissance (resolution) component (AR(R)C) 44 as will be shown.

The network management system 38 generates all of the data needed by a carrier or vendor to act on a current situation. In accordance with one aspect of the invention, the network management system 38 includes a vendor link that allows data useable by the vendor to be transmitted automatically to a vendor via the vendor link. The network management system 38 can also send an alert to contact personnel for a managed network of the enterprise system in which a detected event has occurred. To this end, the network management system 38 employs external communication methods, such as the use of telephone, e-mail or pagers, etc.

With reference to FIG. 2, in one embodiment, the network management system 38 includes an event identification or notification agent 40, an event collection agent 42 and an automatic reconnaissance (resolution) component, or AR(R)C 44. The event identification agent 40 interfaces with an enterprise system and detects activity inputs 41 produced by activity sources 20 of the enterprise system being managed. The activity sources 20 can include data networks, operating systems, and application systems, although other types of activity sources 20 would be apparent to those of ordinary skill in the art. An activity input 41 can be any type of event detected on a computer or system including, without limitation, application transactions, system and application based logons, and file transfers.

The network management system 38 monitors operations of the managed network to detect events and produces event data records indicative of the events. The event identification agent 40 produces an event data record 43 for each input activity 41 identified and passes the event data records 43 to the event collection agent 42. The event collection agent 42 translates the event data records and forwards the event data records to the AR(R)C 44 which normalizes the event data received to remove extraneous information and to incorporate client specific information to produce data useful in obtaining resolution of the problem that resulted in the generation of the event data. The AR(R)C 44 analyzes the normalized event data to determine what steps have to be taken to obtain resolution of the event and generates a suitable response. The response can include accessing a carrier or vendor via a vendor link to either to alert the vendor as to the presence of a possible network systems operation failure and/or to cause the testing to be initiated by the vendor to correct the fault.

In one embodiment, the AR(R)C 44 is divided into four main operational components: (1) a real-time parse/analysis component 45; (2) a data merge component 46; (3) a data analysis component 47; and (4) a response capability component 48. Components 45-47 are collectively referred to as an aggregation manager 50. The components 45-48 of the AR(R)C interact to provide real-time event recognition and response. Each of these components 44-48 is described generally, and then in more detail below. The preferred operating sequence is a real-time parse/analysis by component 45, followed by the merging of data obtained from a client database 52 with portions of the event data by the data merge component 46, subsequent analysis of the merged data by data merge component 47 and then, providing a suitable response through the response capability component 48. However, there can be additional or fewer steps, and some of the steps indicated above can be skipped if they are not needed or are not applicable.

Briefly, as an activity input 41 enters into the system, it is observed by at least one event identification agent 40 that is programmed to identify particular events and create an event data record 43 based on programmed logic. The event identification agent 40 can be any type of application or hardware which is used to monitor activity input 41 in a system and can include network controls (e.g., firewalls, intrusion detection systems), system controls (e.g., mainframe network or user access network systems, host based intrusion detection systems), and/or application controls to monitor events such as web server logs and other application activity. The event identification agent 40 is programmed to observe and create an event data record 43 based on a wide variety of pre-identified events that meet pre-defined criteria, which can include more traditional network events such as circuit and pvc (permanent virtual circuit) outages, device failures, ISDN activations, to more untraditional events including system application errors, edit failures and demographic sampling. However, it will be apparent to one of ordinary skill in the art that the network management system of the present invention can be programmed to detect and process any type of event.

If the event identification agent 40 identifies an event, the event identification agent 40 creates an event data record 43 that can include some or all of the activity data as well as additional data summarizing the event. The event identification agent 40 then passes the event data record 43 to at least one event collection agent 42, which performs any needed protocol conversion on the event records data, determines if a pattern recognition analysis is required, and routes the event data record 43 to its proper destination. If the event collection agent 42 determines that pattern recognition analysis is needed on the event data record 43, the event collection agent 42 forwards the event data record 43 to an event pattern recognition processor 64. The pattern recognition processor 64 determines if the incoming event data is that for the type of events that generally produce alarms. The event pattern recognition processor 64 performs pattern recognition analysis on the event data record 43 and supplements the event data record if the event data record 43 holds data that match the logic parameters programmed into the event pattern recognition processor 64. If the logic parameters are met, a recognition result is achieved and the event pattern recognition processor 64 adds additional information to the recognition result, supplementing the event data record 43. The event data record 43 is then returned to the event collection agent 42 where it is translated, routed and eventually forwarded to an aggregation manager 50, which accumulates and aggregates all of the incoming event data records 43 at a single location.

The incoming event data records 43 are stored in a temporary memory, such as a cached data store 51, under the control of the parse and analyze event data component 45. The cached data store 51 can be a memory or a short term file, with a total capacity being driven by the volume of incoming records 43 versus available space for short-term storage of incoming records. By way of example, the event data can be maintained in the cached data store 51 until the problem is corrected or for a predetermined length of time, such as twenty-four hours. The permanent data store is updated regularly, such as once each minute. However, the cached data store 51 contains the most recent data. For example, any data returned by the vendor is initially directed to and stored in the cached data store 51. The event data are transferred from the cached data store to a permanent storage 53 on a periodic basis. The event data, including the merged data, can be deleted from the cached data store 51 at the end of the predetermined time or when the event upon resolution of the event to which the event data pertains. In one embodiment, the cached data store 51 can reside within the aggregation manager 50.

The aggregation manager 50 reviews the incoming event records 43 before or after storing the records in the cached data store 51 to provide immediate real time notification of events and events which meet the criteria of particular logic triggers. The aggregation manager 50 generates the real time notification depending upon the logic triggers and a severity code attached to the incoming record. For example, if the aggregation manager 50 receives an event data record 43 that contains a severity code defined as "critical" to the environment, the logic trigger of the aggregation manager 50 can automatically cause the response capability component 48 to generate a real time notification through methods known by those of ordinary skill in the art including, without limitation, electronically transmitting information identifying an alarmable event to a vendor via a vendor link 82 (FIG. 9) and transmitting a message to a client via external communication media such as telephone, hand-held personal messaging devices (i.e., pagers, cell phones, PDA's) or other devices. It should be noted that the aggregation manager 50 can have logic triggers that review other types of information in addition to, or in place of the severity codes, including type of event or other types of information desired by the system operator.

The received event data provided to the aggregation manager 50 by the event collection agent 42 typically is somewhat cryptic in nature and can include a numeric, alphabetic or alphanumeric identifier for a port, a frame relay pvc (permanent virtual circuit), a site, a device which indicates the source of the event data, a client name, etc. along with other information related to the network event or to a client. The parse and analyze event data component 45 parses the received event data to remove extraneous data and to identify those components of the data that can be useful in obtaining reconciliation of the event.

The data merge component 46 uses the information derived from the event data by the parse and analyze event data component 45 to access static, client specific data stored in a unified database (UDB) 52. The UDB 52 stores information about the client and the vendor. The client information that can be stored in the UDB 52 can include client name, client contact(s) and contact numbers, client site locations, both main (local) or branch (remote) locations, and the type of facility (operations center, branch, ATM), for example. Vendor information contained in the UDB can include vendor ID, vendor type, vendor contact(s), electronic vendor address (such as HTTP, XML, FTP) or email address, circuit ID, circuit type, customer premise equipment (CPE) location, and notification parameters, for example.

In accordance with the invention, static client and vendor data stored in the UDB 52 are used as a part of the solution to a problem that has been detected in the network being managed. In addition, the UDB 52 can also store an event journal that includes information as to status of an even, information as to steps that have been taken in resolving/correcting the event, relevant times and dates, etc. The event journal is updated to reflect any changes in the status of a network event.

The data merge component 46 merges the data obtained from the UDB 52 with the parsed data that the parse and analyze event data component 45 has extracted from the received event data. Thus, the data merge component 46 effectively joins disparate data elements immediately, enabling further automations to occur. This normalizes the received event data, producing normalized data that is useable by a vendor, for example, to open a trouble ticket and correct the fault that caused the creation of the event data. The returned, normalized data help identify subsequent action to be taken to resolve the problem.

The normalized data are supplied to the data analysis component 47 which analyzes the normalized data and determines actions to be taken. The AR(R)C 44 can initiate automated personnel notification and escalations by certain designated event types. In addition, the data analysis component 47, via an automation generation component 49 (FIG. 7), can format the normalized data into a format such that the normalized data are directly useable by a vendor. In the preferred embodiment, the network management system 38 uses Extensible Markup Language (XML)as the transfer mechanism for communications with vendors.

The response capability component 48 provides a suitable automated response which can include sending relevant portions of the normalized data to the appropriate vendor, and contacting personnel of the client by a telephone, a pager, e-mail etc., or other suitable communication media to alert a contact person(s) as to the alarm condition. The response capability component 48 also allows personnel associated with the network management system 38 to view and/or monitor the status of alarm conditions. In addition, the response capability component 48 also can open a work ticket for the vendor. However, a work ticket is not opened if a problem corrects itself or is not critical.

The incoming event and recognition data records and the normalized data records are maintained in the cached data store 51 for a predetermined length of time and subsequently are transferred, via a gateway 54, to a persistent data warehouse 53 for long term or permanent storage. The gateway 54 acts to pass and format the incoming event data records for storage in the persistent data warehouse 53 for use in creating internal reports 55. The persistent data warehouse 53 can be any mechanism known by those of ordinary skill in the art to provide long term storage of data including application databases and expandable memory.

Networked System Management

Figure 3:
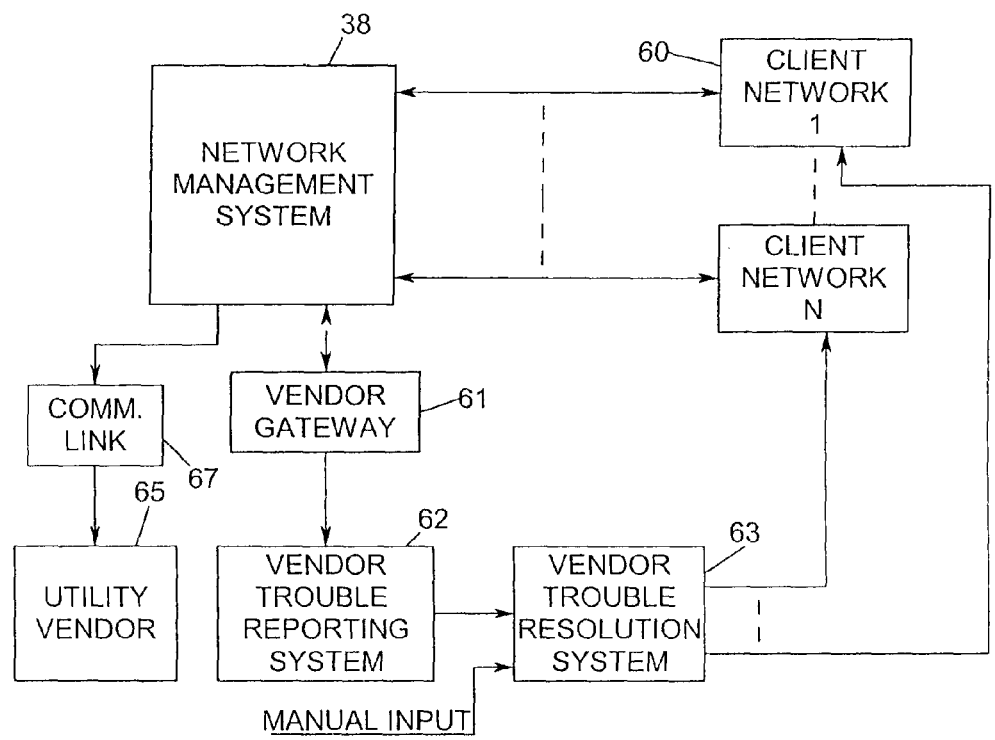
FIG. 3 is a block diagram of a plurality of managed network incorporating the network management system shown in FIG. 2.

Referring to FIG. 3, by way of illustration of the invention, the network management system 38 is described with reference to an application for monitoring a plurality of client networks, such as client network-1 . . . client network-N, in managed network systems in enterprise systems. The client network-1, indicated by reference number 60, can be that for a financial institution, such as a bank, a credit union and the like, for example, or any other type of enterprise that employs managed data networks. The financial institution may include facilities at different locations. For example, a bank typically includes a main location and one or more branch locations. There are two general types of network system management. One type of network management, commonly referred to as backbone management, extends out only to the operations center of the financial institution. Another type of network management, commonly referred to as fully managed, includes branches as well as operations centers of the financial institution.

The networked system 60 includes components provided by a vendor. For example, the vendor can provide and maintain a frame relay network portion of a client's managed network. The vendor can also provide data communication links between the financial institution and the site of the network management system, communication links between the operations center and the branches, communication links between the operations center of the financial institution and remotely located ATM machines for that financial institution, etc.

Briefly, the network management system 38 monitors the networked system 60. When a fault condition is detected, the network management system 38 receives the event data and normalizes the event data by removing information not relevant to obtaining resolution of the event and adding information from the client database that is useful in obtaining resolution of the event. The AR(R)C 44 (FIG. 2) creates information for the vendor and supplies the information automatically to the vendor via the vendor gateway 61.

The AR(R)C 44 normalizes the event data and instantaneously electronically formats the data to share with the vendor. The information is automatically supplied to a trouble reporting system 62 of the vendor to identify the problem equipment, etc. for a vendor trouble resolution system 63. In the preferred embodiment, the vendor trouble reporting system 62 can be a web-based reporting system. The AR(R)C 44 uses Extensible Markup Language (XML) to supply information to the vendor. This allows the response information to be written directly to a server of the vendor by the network management system 38, without manual intervention. Because of the automated nature of the network management system 38, correction of a problem can take as little as a few minutes and typically takes no more than about twenty minutes, as compared with prior art network management system which can take 1.5 hours or more to start correcting a problem. In addition, a vendor work ticket can be opened automatically and transmitted to the vendor within a minute or so of detection of an event.

The AR(R)C 44 receives and normalizes event data and can initiate testing (using vendor software) to pinpoint the fault. The system allows vendor partners to push data relating to reported information back through the vendor gateway 61, allowing updating of the event journal in the UDB 52 as to status of an event and as to steps that have been taken in resolving/correcting the event.

Using the information supplied to the vendor by the network management system 38, the vendor resolution system 63 can run test routines to identify the fault. The network management system 38 can provide instructions as to which tests are to be performed as well as specifying portions of the client network on which the tests are to be performed.

In this regard, the vendor gateway 61 is an input to the vendor trouble reporting system 62. The AR(R)C 44 identifies components affected by an event alarm and gathers relevant data with subsequent action, such as opening a work ticket for the vendor. This integration permits immediate action specific to the externally correlated data.

In some instances, the event can be a problem, such as an electrical power failure, over which the vendor has no control. In such instances, the vendor can so informs the network management system 38 via the vendor gateway 61. The network management system 38 can issue further instructions, such as advising the client and/or advising a utility 65, such as an electric power company, over a communication link 67 (or a separate vendor link), identifying the location of the power outage to the power company.

While the network management system 38 is described with reference to an application in a managed network system, the network management system 38 can also be used in other applications such as to oversee a computer system and indicate processors, servers, etc. that are down.

DETAILED DESCRIPTION

Event Identification and Collection

Figure 4:
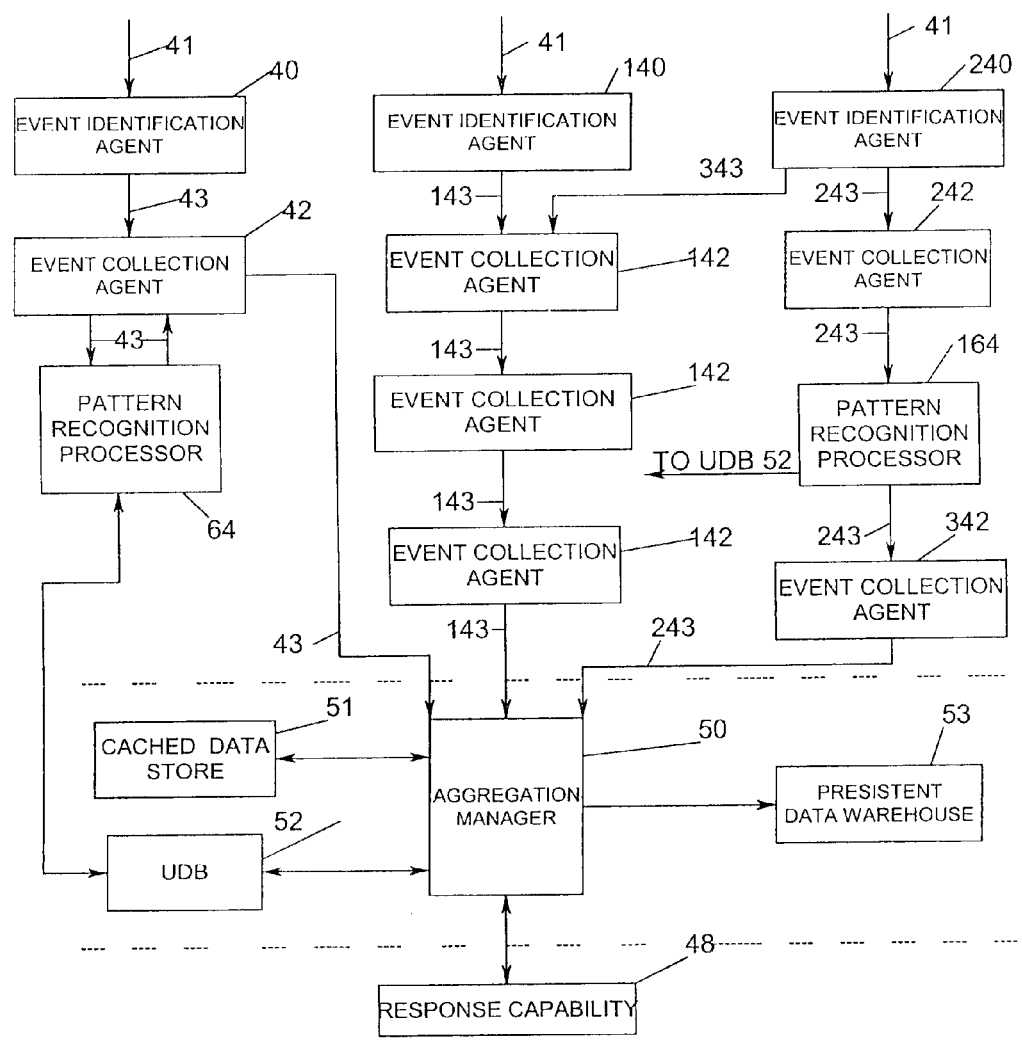
FIG. 4 is a block diagram of a real-time analysis component of the network management system shown in FIG. 2 detailing the relationship between multiple event identification agents and a series of collection agents and an aggregation manager of the network management system.

Considering the network management system 38 in more detail, with reference to FIG. 4, the event identification and collection portion of the real-time analysis component of the network management system 38 is shown in more detail. As an activity occurs in a networked system being managed, one or more event identification agents 40, 140, 240 observe the activity input 41 to identify an event, which can include any type of activity input 41 that the network management system 38 is monitoring. The event identification agent 40 can be a custom designed product or a commercial product, and as discussed above can serve a network control, system control or application control function within the overall network management system 38. Once the event identification agent 40 identifies an event, the event identification agent 40 generates an event data record 43 that includes activity data and can also include additional data summarizing the event in a protocol specific to the event identification agent 40. The event data record 43 is then forwarded to an event collection agent 42 for further processing and aggregation. Depending upon the desired system architecture, each disparate event identification agent 40 can be affiliated with one or more event collection agents 42, 142, 242, as shown in FIG. 3. This can serve as a redundant back-up or for different analysis by the event collection agent 42 as will be discussed in greater detail below.

The event collection agent 42 has a routing function and a protocol translation function, and is also programmed to detect particular event records 43 that require further analysis. The event records 43 that fall under this category are forwarded to the event pattern recognition processor 64 for pattern analysis. The event pattern recognition processor 64 is an additional logical unit that performs statistical analysis on event records 43 to identify a recognition result, which is a particular type of potential event. This is accomplished by statistical pattern recognition and analysis based on a programmed pattern and logic library to detect pre-identified parameters. The event pattern recognition processor 64 begins a cyclical process of key/value comparison between the event records 43 and the various logic modules through a discreet and/or threshold process having multiple stages. By way of example only, the event pattern recognition processor 64 can employ a threshold logic process to compare any field (key) values in the event data record 43 to those intervals, duration's, and/or counts (e.g., watchdog timers, incrementing/decrementing counters, loops, Boolean switches, etc.) defined within the module. If any of the conditional threshold parameters satisfy the terminus condition(s) and identify a recognition result, the event pattern recognition processor 64 supplements an event record 43 with data obtained from the UDB 52 and forwards the event record to the event collection agent 42 for further processing and response. The event pattern recognition processor 64 continues this type of iterative processing of any additional event records 43 received, as required by the module's logic, to reach the terminus condition. Although the logic and system described herein is shown, it would be obvious to those skilled in the art to use any type of logic to identify recognition results.

If the event pattern recognition processor 64 and its logic modules identify particular discreet and threshold parameters, information is added to the event data record 43 to further define the event as a recognition event. The informational data attached to the event record 43 can include a severity code that labels the recognition result as "critical" or "moderate," a response code, or any other type of information a system operator would desire to make the event processing and response system more efficient. Further, the event records 43 can be supplemented either during or at the completion of the processing cycle of the logic module. This intra-cycle event record processing process permits real-time response by allowing for severity escalation if an ongoing communication increases in intensity or diversity. This escalation occurs by the transmission of multiple events records 43 that can throttle the severity of an event up or down according to predefined logic. Once an event record 43 is supplemented, it is returned to the event collection agent 42 for subsequent routing and translation as will be discussed below. Although the event pattern recognition processor 64 works in conjunction with the event collection agent 42, it is not a required element in order to achieve a complete event data record 43 transmission from an event identification agent 40 to the aggregation manager 50. However, the event pattern recognition processor 64 is required to achieve additional levels of pattern recognition on near-term event messages.

Figure 5:
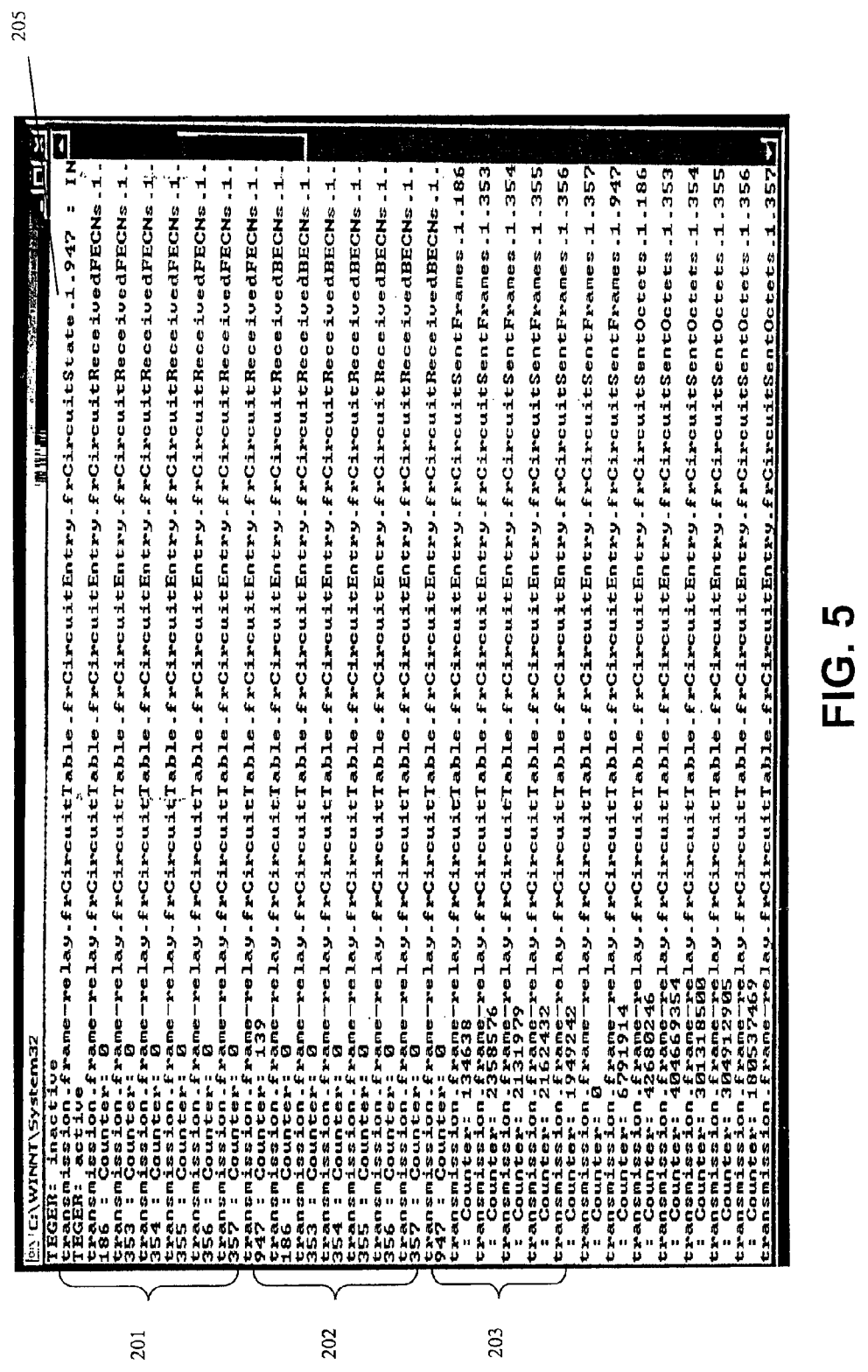

FIG. 5 is a screen shot showing the content of typical event data records transmitted to the network management system 38 (FIG. 2) from a vendor site. The raw event data is used by the event pattern recognition processor 42 to access a look-up table, knowing the source of the event data (indicated by the identity of the device) and the identifier number, to supplement the raw event data.

The event data includes a plurality of (event data records) sets of event data, such as records 201, 202 and 203. The information shown in FIG. 5 is representative of the type or raw event data that is provided to network management systems. In the example, each record includes seven lines of event data. Although not apparent for FIG. 5, the data is useable to enable the event collection agent to obtain information about the. As is readily apparent, the event data do not readily provide much information about components, such as frame relays the conditions of which are being monitored by the network monitoring system 38.

FIG. 6 is a screen shot showing the content of event records after supplementing by an event recognition processor of the network management system shown in FIG. 2. One entry, indicated by reference numeral 210 includes a timestamp 211, which indicates when the event data was received. The event data also includes the identity of the source of the event data, indicated at 212 as being a router, and an indication of the status of the component to which the event record applies. Although these event records are somewhat more intelligible, the event records does not provide much more information about a component the condition of which is being monitored than does the raw event data shown in FIG. 5. The event data records shown in FIG. 5 are stored in the cached data store 51 along with a problem code ID.

Referring again to FIG. 4, as is stated above, the event collection agent 42 routes, translates, and finally transmits the event records 43 to an aggregation manager 50. Because the event collection agent 42 can perform any or all of the functions described above, there is no limit as to the number of event collection agents 42 that can be used within the enterprise system as illustrated in FIG. 3. For example, a plurality of event collection agents 142 can be arranged in series, with one or more event collection agent collecting event records from one or more event identification agents (or from a pattern recognition processors and/or other event collection agents). For example, event collection agent collects event record 143 from event identification agent 140 and collects event record 343 from event identification agent 240. In addition, a plurality of event collection agents 42, 142, 242 can be arranged in parallel over the entire system, each event collection agents (or a series of event collection agents 142) processing event records 43 from other disparate event identification agents 40. For example, one event collection agent 242 can receive the event record 243 from an event identification agent 240 and then forward that event record 243 to an event pattern recognition processor 164, which supplements the event record 143 and forwards the event record 143 to another event collection agent 342.

Each event collection agent, such as event collection agent 42, translates the event record to a unified system protocol used in communications with the aggregation manager 50 and forwards the translated event records, such as event data record 43, to the aggregation manager 50. The ability of an event collection agent to "stack" while maintaining a modular architecture, capable of growth. This feature also permits integration of the pattern recognition processor into the event record flow after the event identification agent, but before the aggregation manager. For example, the event pattern recognition processor 164 is integrated into the flow for event record 243 after the event identification agent 240, but before the aggregation manager 50.

As mentioned above, each type of event identification agent 40 can have its own protocol. This requires that each event collection agent 42 maintain the necessary support of the specific protocol being used by the event identification agent 40 either as a core function or an additional module. As stated above, multiple event identification agents can direct event records to one event collection agent (i.e., event identification agents 140 and 240 are shown as directing respective event records 143 and 343 to event collection agent 142). Thus, the event collection agents can expand or adapt to cover any number of protocols that can be in use by numerous disparate event identification agents.

Once the event records, such as event records 43 and 143, are formed and translated, they are forwarded to the hub of the network management system of the present invention, the aggregation manager 50. The aggregation manager 50 collects all of the incoming event and recognition records from various discrete and disparate points in the system environment (e.g., through the intermediary event collection agents 42, 142 and 242) and stores the incoming records in the cached data store 51.

Real Time Parse/Analysis Component

Figure 7:
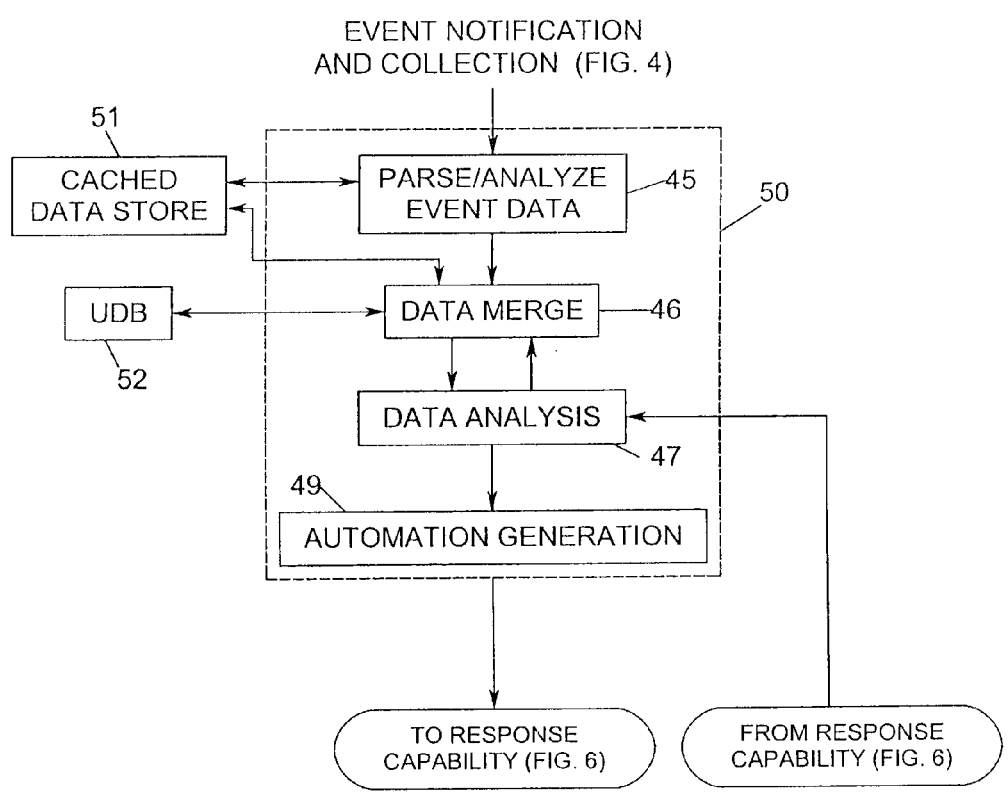
FIG. 7 is a block diagram of an aggregation manager of the network management system shown in FIG. 2.

Referring now to FIG. 7, the real time parse/analyze component 45 of the aggregation manager 50 stores the event data in the cached data store 51. The parse and analyze event data component also parses and analyzes the event data to identify components of the event data that are necessary to obtain resolution of a fault or failure indicated by the event data. The data typically are somewhat cryptic and can include a numeric, alphabetic or alphanumeric identifier which identifies a component within the managed network being monitored. The information as provided by the event data record is unusable by a vendor without processing to supplement the information with information that enables the vendor to know the nature of a problem, such as what component has failed, and the site of the failure, for example.

The parsed data are used to access the UDB 52 to obtain additional information relevant to the event, such as the identity of the source, the vendor involved, the name of the client, the site of the fault or failure, and the contact person for the client, contact information (a telephone number, a facsimile number, a cell telephone number) for example.

The cached data store 51 is a memory resident data store or data file that retains a queue of event incoming records for a limited duration. The primary limitation on the cached data store 51 is available space to store incoming records. Obviously, as technology develops, the ability to hold more data on the cached data store 51 will also increase. Because the cached data store 51 is a temporary storage facility, it acts to hold both real-time and near term event data for analysis and response. The data obtained from the UDB 52 are provided to the data merge component 46 of the AR(R)C 44 for further processing.

Data Merge Component

With continued reference to FIG. 7, the data merge component 46 uses the information derived from the event data by the real time parse/analyze component 45 to identify client and vendor specific data stored in the UDB 52 and to merge that data with the portions of the event data extracted from the event record by the parsing function. This normalizes the received event data, producing normalized data that is useable by the vendor in obtaining reconciliation of an event. The normalized data help identify problem areas for subsequent action. For example, during the analysis, the AR(R)C 44 determines if action should or should not occur. The AR(R)C 44 can initiate automated personnel notification and escalations by certain designated event types.

Figure 8:
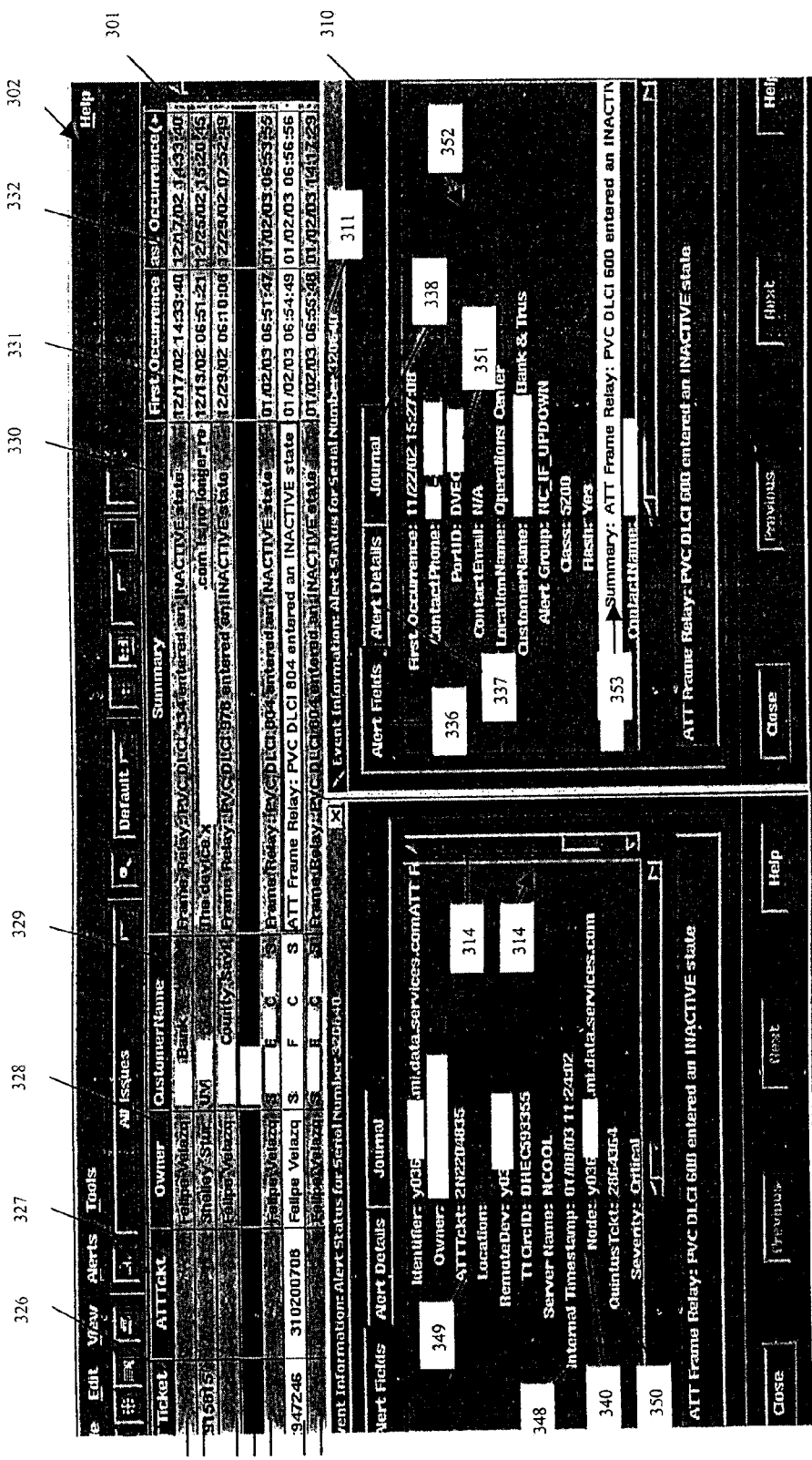
FIG. 8 is a screen shot showing alert status conditions for a plurality of events for client networks being managed by the network management system of the present invention.

FIG. 8 is a screen shot displaying, in the upper portion 301 of the screen 302, alert status conditions for a plurality of events in rows 303-309 for client networks being managed by the network management system of the present invention. Portions of the data that is displayed in some of the data fields has been blocked out. The data display has a drill down capability, allowing supplemental information pertaining to an event to be displayed. An event has been selected, by clicking on the event, bringing up a drill down 310 that shows alert status for an event that has been assigned a Ser. No. "320,640" indicated at 311. The information is displayed in two parts on the left and right hand portions of the screen as the result of the operator scrolling down using the scroll bar 314.

The upper portion 301 of the screen 302 shows in tabular form a listing of information for a plurality of events. A table 325 includes a column 326 for an ST Ticket number, a column 327 for a Vendor Ticket number, a column 328 for the name of the owner, a column 329 for the client name, a column 331 indicating the time of first occurrence of the event and a column 332 for indicating the time of last occurrence of the event. The table 325 further includes a column 330 containing a summary of conditions for each site, each listed in a separate one of a plurality of rows. The conditions can be displayed in a color coded fashion to indicate active conditions, conditions that have been resolved and conditions that remain unresolved. For example, the row 307 includes event information indicating that a frame relay "PVC DLCI 804" entered an inactive state. The next row 308 includes updated event information indicating that a vendor ticket "2N1 94246" was opened for the event for frame relay "PVC DLCI 804" approximately three minutes after the first occurrence of the event was detected and that an internal ticket "310200708" also has been opened for this event. As can be seen by comparing the event data (FIG. 6) with the merged event data, as shown in FIG. 8, the readabilty of the event information is substantially improved. Moreover, the merged event data is more readily transformable into a format that is directly usable by the vendor, allowing correction of the fault or failure that created the event to be started automatically and substantially without any intervention by the vendor.

Referring again to FIG. 7, the data merge component 46 refreshes the event data stored in the data cache store 51 to reflect the information that has been added to the event record being processed and supplies the merged data record to the data analysis component 47 for further processing and analysis.

Data Analysis Component

With continued reference to FIG. 7, the data analysis component 47 processes the normalized data provided by the data merge component 46 to analyze the merged data to identify faults and additional information to enable the correction of the faults. For example, the data analysis component determines whether or not further action should occur.

One function of the data analysis component 47 is to screen events to minimize the number of events that have to be responded to. By way of example, there can be 100,000 events per day. However, of these, typically less than about 200 are alarmable. Some of the detected events are indicative of a potential problem. This "warning" information can be tracked over time and action taken when appropriate. The AR(R)C 44 can include a counter for counting some or all of the (common) events and trigger a response when a given event occurs a given number of times.

Another function of the data analysis component 47 is to determine whether a vendor work ticket is to be opened, and if so, provide to the response capability the information necessary to open a vendor work ticket. The data analysis component also causes an internal work ticket to be opened and provides the response capability the information necessary to open the internal work ticket. The data analysis component also determines whether a client or vendor contact needs to be called. In this regard, for example, the data analysis component forwards the appropriate telephone numbers to the response component.

Thus, once events are determined to be critical to infrastructure integrity, event information is forwarded by the data analysis component 47 to the response capability component 48 (FIG. 9) for resulting action. The data analysis component 47 generates action or response commands derived from the merged data, including data extracted from the event data records and additional contextual data obtained from the UDB 52, and forwards these commands and the associated data to the response capability component 48 for further action. An automated action component 80 (FIG. 9) of the response capability component 48 formats the normalized event data into Extensible Markup Language (XML) for communications with vendors. The automation generation component 49 creates a response data packet for each alarmable event detected by the network management system 38. The normalized activity data that is communicated to a vendor can automatically initiate testing (using vendor software) to pinpoint and/or correct the fault that caused the alarm condition.

Because all event data records 43 are formatted to a particular protocol and are aggregated within the aggregation manager 50, the network management system 38 has unified aggregation architecture. Therefore, any variety of event identification agents 40 can be used, with all records aggregated to a single point. After analysis of the merged event data records 43 by the data analysis component 47 of the AR(R)C 44, the portions of the merged event data required to automatically respond to the event are forwarded to an automated action component 80 (FIG. 9) of the response capability 46 for response.

The aggregation manager 50 also generates automated electronic notifications to the response capability component 48 to provide real-time notification of activity occurring within the system environment. The aggregation manager 50 can transmit the notification through a message system such as a personnel notification system (PNS) that can include various forms of communications, both digital and analog. These notifications can take the form of alphanumeric messages sent using various transport protocols to end devices known by those skilled in the art including, but not limited to, pagers, cell phones, PDA's, etc.; or other such medium like electronic mail messages. The notification is generated by defined logic triggers within the aggregation manager 50. The logic triggers are designed to define what events should generate a notification, how the notification should be sent, who should receive the notification, and the potential escalation path. By way of example only, a logic trigger can be designed to identify particular severity codes given to the event record from the pattern identification processor 42. If the logic trigger identifies the particular severity code, the notification is sent to the response capability component 48 through the automated notification system. Although this example shows one embodiment of using the logic trigger, it is apparent that the logic trigger is not limited to a particular severity code, but can identify any incoming record with a particular data set.

It is pointed out that information reported and generated from this process and forwarded to a vendor can be returned back into the aggregation manager 50 and can, in turn, generate further event messages, escalations and actions. The returned information can be stored in the cached data store and/or included in the event journal stored in the UDB 52.

Response Capability Component

Figure 9:
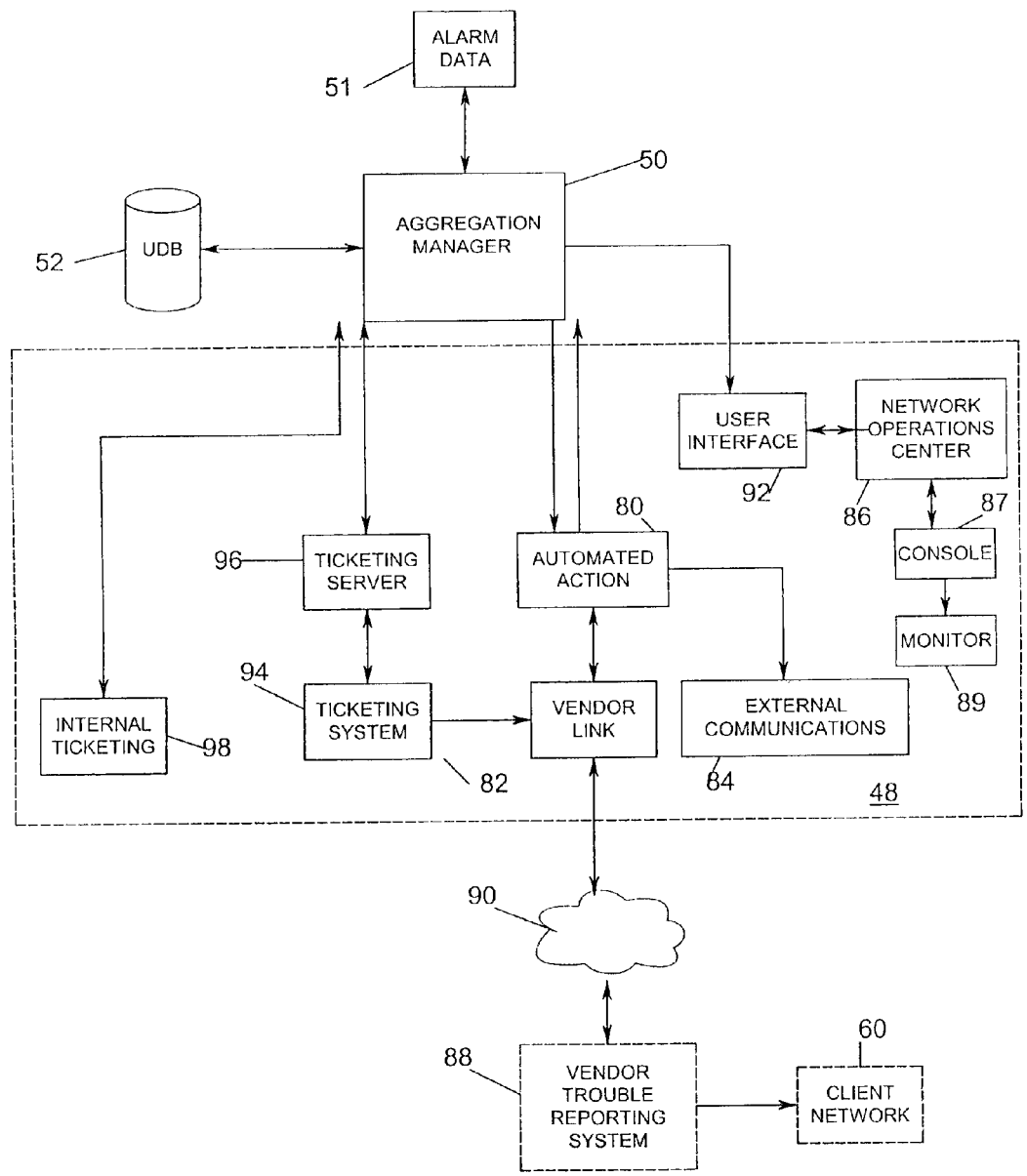
FIG. 9 is a block diagram of a response capability component of the network management system shown in FIG. 2.

Referring to FIG. 9, the response capability component 48 includes an automated action component 80, a vendor link 82, an external communications component 84, and a network operations center (NOC) 86. The response capability component 48 also includes a ticketing system 94. The ticketing system 94 receives information from the aggregation manager 50 via a ticketing server 96 to produce work tickets for vendors. The ticketing system 94 can also receive information from an internal ticketing system 98 to produce work tickets for the service provider.

The automated action component 80 responds to commands provided by the aggregation manager 50 to transmit a suitable response to the vendor and/or to the client. The response provided by the response capability component 48 can include accessing the vendor trouble reporting system 62 via the vendor link 82 to alert the vendor as to the existence of a problem and/or to automatically initiate testing (by the vendor trouble resolution system 63) at the site of the fault using vendor software. The response can also include automatic generation of a work order ticket via the ticketing system 94. Moreover, the automated action component 80 controls the external communications component 84 to initiate automated personnel notifications and escalations in response to designated event types.

The vendor link 82 brings client information into the "solution". The vendor link 82 is a component of the AR(R)C that accesses the vendor gateway. The vendor "gateway" is accessible via a communications network 90, such as the world wide web, with vendor link 82 being the interface between the vendor gateway at the output of the AR(R)C. In one embodiment, the vendor link 82 is a gateway that provides access to the client network being monitored by the network management system 38. The gateway is made available by the vendor. In accordance with the invention, the network management system 38 automatically accesses the gateway via the vendor link 82 in the event of a problem associated with a component(s) or services being provided by the vendor. The vendor link "calls" the vendor and when a connection has been established between the vendor link 82 and the vendor trouble reporting system 88, transmits the data to the vendor. Also, the network management system 38 can use remote control via the vendor link 82 to cause the problem to be corrected. The network management system 38 accesses the vendor link 82 automatically and starts the correction process, including initiating tests of portions of the client network being monitored by the vendor's trouble shooting software/equipment.

As stated above, the network management system uses Extensible Markup Language (XML) as the transfer mechanism for communications with the vendor. This allows information being supplied to the vendor to be written automatically to a vendor server by the network management system 38. XML is extensible and platform independent.

The vendor link 82 is coupled to the vendor trouble reporting system 88 via a communications network 90. The vendor trouble reporting system 88 can be a web-based reporting system and the communications network 90 can be the world wide web. The vendor trouble reporting system 88 provides a means to report outages to the vendor, allowing the vendor to correct network faults that are detected. The vendor trouble reporting system 88 is connected to the network of the client network 60. The vendor trouble reporting system 88 can feed information relating to a fault condition and to correction of such fault condition back into the network management system 38, resulting in further event messages and escalations.

As is stated above, the network management system 38 is automatic and does not require any manual intervention. A work order ticket can be generated automatically (export data to the "vendor"). The network management system 38 determines from event data who the contact person is for the managed network. The automated action component 80 accesses the vendor link 82 automatically and starts the correction process, including initiating tests by vendor trouble shooting software/equipment.

A work ticket can be generated automatically (through actions of the data analysis component 47) in response to event data, using information stored in the cached data store 51. In addition, a vendor can create its own work ticket and return its own work order number to the network management system 38 via the vendor link 82. The network management system 38 can return the ticket number along with the other data via the vendor link 82. The vendor created work ticket number can be stored in the cached data store 51 under the control of the data analysis component, for example.

The automated action component 80 also initiates automated personnel notifications through the external communications component 84 and escalations by certain designated event types. The external communications component 84 uses external communication methods, such as telephone, e-mail or pagers, etc. Pager fields can be populated with data retrieved from the UDB 52 by the aggregation manager 50. For example, the data can be obtained from the UDB 52 under the control of the data analysis component and provided to the automated action component 80 by the automation generation component 49. The external communications component 84 enables notification of a person in charge or personnel of the managed network system of the existence of a problem. Client contact personnel can be alerted to the presence of a problem by calling one or more client contact personnel or sending an e-mail to one or more client contact personnel.

Because of the automated response provided by the network management system 38, typically, it takes only a minute or less to isolate a problem and initiate a solution. In some cases, a problem can be detected and corrected in less than a minute. Moreover, a work ticket is created automatically for any issue with a client and, in most instances, a work ticket can be opened within about a minute following the detection of an event.

Figure 10:
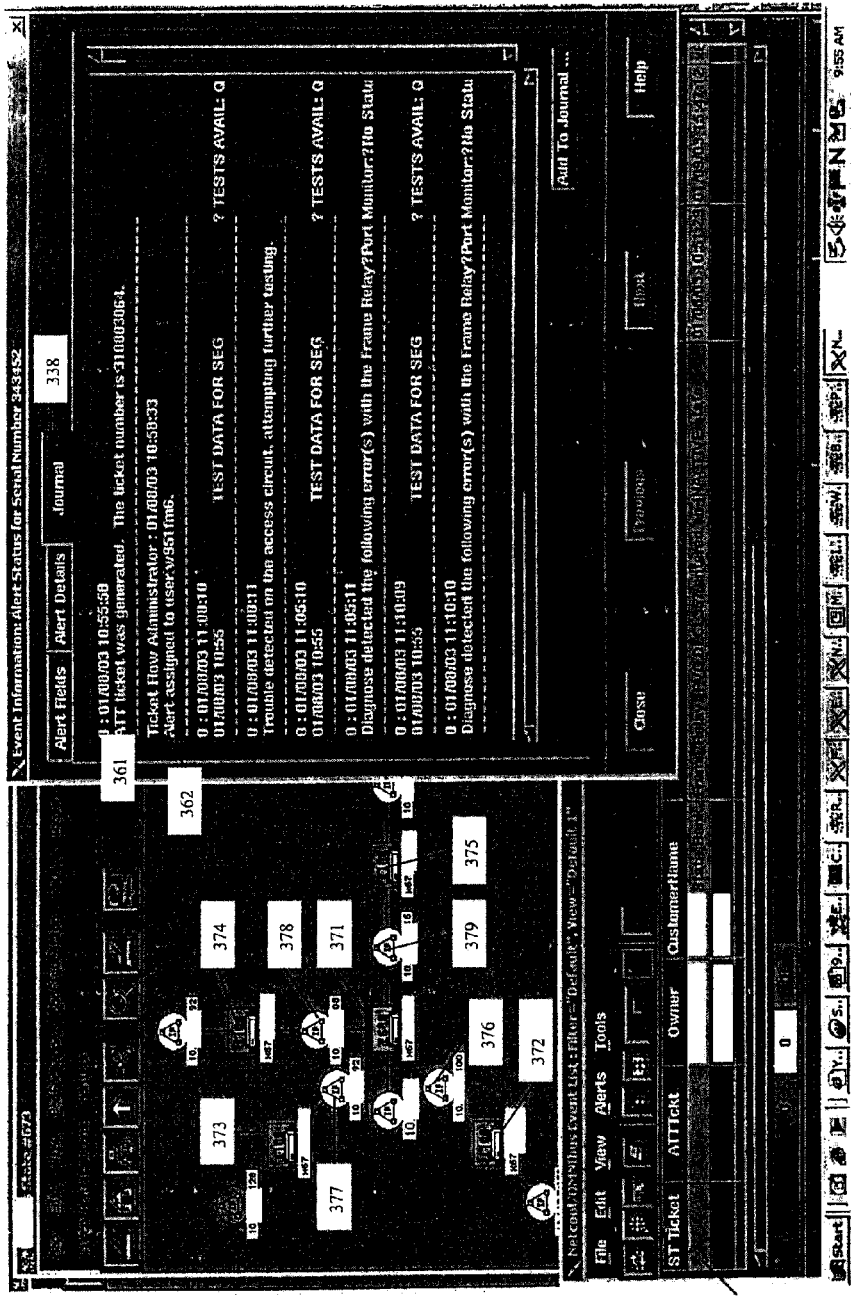
FIG. 10 is a screen shot showing a portion of an event journal for event information for a client network being managed by the network management system of the present invention.
Figure 11:
FIG. 11 is the screen shot of FIG. 10 after selecting additional client contact details to be displayed.

The NOC 86 can include one or more consoles or monitoring stations 87 for operations personnel. The consoles 87 can include a monitor 89 with a display screen for displaying information on demand and input devices, such as a mouse, allowing network operations personnel to access data stored by the AR(R)C 44 for display on the monitor 89. An example of the type of information that can be displayed by a monitoring station is illustrated in FIGS. 8, 10 and 11.

The NOC 86 is coupled to the aggregation manager 50 through a user interface 92, allowing the operations personnel to search the cached data store 51. The user interface 92 can be either a platform dependant interface or a platform independent interface. Generally, a platform dependant interface requires greater network and system resources to function, including network bandwidth, CPU speed, and memory. However, current platform dependant interfaces provide a greater array of functionality and response over other interface methods because fewer tools are required to operate the interface, and a platform dependant interface is more robust and provides more features than a platform independent interface. As technology improves, a platform independent interface may provide the same benefits while requiring minimal network and system resources.

The NOC 86 has access to the real-time parse/analyze component 45 of the AR(R)C 44 through the user interface 92. The NOC 86 functions as a high-order decision and monitoring point within the network management system 38, allowing viewing of information via a fault topology server. The user interface 92 connects the NOC 86 to the aggregation manager 50, allowing monitoring personnel to view conditions of the managed network, perform event diagnosis, damage containment and/or repair. Elements of the real time parse/analyze component 45 and the data merge component 46 enable user interface access to critical client information stored in the cached data store 51 by simple point and click operations, using the network operations center 86. This allows operations personnel to view, interpret monitor and respond to event messages generated by the AR(R)C 44. The NOC 86 uses topography (map) to identify the site where the fault exists.

Referring again to FIG. 8, as described above, the screen shot shows alert status conditions for a plurality of events for client networks being managed by the network management system 38 of the present invention.

In addition, a user has double-clicked on an event to bring up a pop-up screen 335 that displays further details pertaining to the event. The pop-up screen 335 includes an Alert Fields tab 336, an Alert Details tab 337, and a Journal tab 338. With the Alert Fields tab 336 selected, the pop-up screen 335 displays information pertaining to a node identified by an identifier y036o130sc.mi.data.services.com, as indicated at 340 The information displayed includes the time of the first occurrence of an event "Nov. 22, 2002", indicated at 347, the internal timestamp 348, the vendor work ticket number 349, the internal work ticket number 350 and the identification of the port 351 for the frame relay. The pop-up screen also shows various contact information as indicated generally at 352 The displayed information also includes at 353 the event summary "ATT Frame Relay: PVC DLCI 600 entered an INACTIVE state".

Some of the information that is displayed is included in the event data record that is received. That information includes the This client specific information is make the event data more understandable to operations personnel and to supplement the event data with client specific information as to a failed component that allows the normalized event data to be used directly by the vendor in obtaining resolution of an event.

FIG. 10 is a screen shot showing a portion of an event journal for event information for a client network being managed by the network management system shown in FIG. 2. Portions of the data that is displayed in some of the data fields has been blocked out. Data contained in the event journal is gathered by using XML returned by the vendor via the vendor interface. The event journal is displayed by selecting the "Journal" tab 338 on the screen 302 (FIG. 8). The event journal includes information as to status of an event, information as to steps that have been taken in resolving/correcting the event, and relevant times and dates, etc. The event journal is updated to reflect any changes in the status of a network event and lists actions that have been taken by the vendor in an attempt to correct the fault. The information displayed includes, in the first set of data, the timestamp for creation of the vendor work ticket and the work ticket number. The second set of data includes the timestamp for creation of the internal work ticket and for alerting the client as to the event. The remaining lines document steps taken to obtain resolution of the event.

As is stated above, the NOC 86 functions as a high-order decision and monitoring point within the network management system 38, allowing viewing of information via a fault topology server. The left portion of the screen shot of FIG. 10 displays a plurality of sites 371-375 for a client, assumed to be a bank, that has selected to have status information displayed. Each site is identified by a site number, such as site number "H673omunis" for site 371. In the example, site 371 represents a main operations center for the client and sites 372-375 are branches of the client bank. The sites 371-375 are interconnected at one or more nodes, such as nodes 376-379. Each node is identified by a node alias. The site locations can be displayed with a color coding to represent status conditions for the various sites.

FIG. 11 is the screen shot of FIG. 10 after selecting additional client contact details to be displayed if manual intervention is needed for any reason. Again, portions of the data that is displayed in some of the data fields has been blocked out. For example, if the problem is a physical problem, such as a power outage, the vendor will send a report to that effect to the network management system. Network operations personnel monitoring the status of such event can then telephone the client, to advise the client that the power outage has occurred. The additional contact details can be brought up by double clicking on the banner 390 at the bottom of the screen. The information displayed includes the circuit name 391, the circuit ID 392 and the circuit port ID 393. Also displayed are the name 394 of the site contact, the telephone number 395 for the site contact, the address 396 of the site and the names of network contacts and phone numbers for network contact personnel.

Although an exemplary embodiment of the present invention has been shown and described with reference to particular embodiments and applications thereof, it will be apparent to those having ordinary skill in the art that a number of changes, modifications, or alterations to the invention as described herein can be made, none of which depart from the spirit or scope of the present invention. All such changes, modifications, and alterations should therefore be seen as being within the scope of the present invention.

What is claimed is:

1. A method of processing events in a network, comprising:
   receiving, from at least one source, at least one data record identifying at least one event events in the network,
   conducting pattern recognition for each data record, wherein the pattern recognition comprises;
     comparing each data record with at least one predetermined logic parameter associated with a known type of network event; and
     based on the comparison, adding information to the data record to create a corresponding modified data record; and
   analyzing at least one of the modified data records to determine whether a response is required; and
   based on the analysis, automatically responding to the events corresponding to at least one of the modified data records based on the information added to the at least one corresponding data record;
   wherein the at least one event in the network is associated with a vendor, and wherein adding information to a data record further comprises:
     determining data corresponding to the at least one vendor; and adding the data corresponding to the vendor to the data record.

2. The method of claim 1, wherein automatically responding to the events comprises at least one of initiating communication with the vendor or opening a work ticket for the vendor.

3. The method of claim 1, wherein adding information to a data record further comprises:
determining a severity associated with the data record;
based on the determination, adding a severity code to the data record.

4. The method of claim 3, wherein automatically responding to the events comprises generating a notification based on the severity code added to the data record.

5. The method of claim 1, wherein the at least one event represents at least one of a network failure, an operation error, a network outage, or an application error.

6. The method of claim 1, wherein the network is associated with a client that operates the network, and with at least one vendor that maintains at least a portion of the network.

7. The method of claim 6, wherein the information added to the at least data record comprises contact information for at least one of the client or the at least one vendor, and wherein automatically responding to the events comprises contacting at least one of the client or the at least one vendor using respective contact information.

8. The method of claim 1, wherein the at least one source comprises at least one of a secondary network, an application on a remote computer, or an operating system on a remote computer.

9. A system for processing events in a network, comprising:
a processor; and
a data store comprising information associated with network events;
wherein the processor is configured to: receive, from at least one source, at least one data record identifying at least one event in the network;
conduct, using a pattern recognition processor, pattern recognition for each data record, wherein the pattern recognition comprises:
comparing each data record with at least one predetermined logic parameter associated with a known type of network event; and
based on the comparison, adding information from the data store to the data record to create a corresponding modified data record; and
analyze at least one of the modified data records to determine whether a response is required, and based on the analysis, automatically respond to the events corresponding to at least one of the modified data records based on the information added to the at least one corresponding data record;
wherein the at least one event in the network is associated with a vendor, and wherein adding information to a data record further comprises: determining data corresponding to the at least one vendor; and adding the data corresponding to the vendor to the data record.

10. The system of claim 9, wherein automatically responding to the events comprises at least one of initiating communication with the vendor or opening a work ticket for the vendor.

11. The system of claim 9, wherein adding information to a data record further comprises:
determining a severity associated with the data record;
based on the determination, adding a severity code to the data record.

12. The method of claim 3, wherein automatically responding to the events comprises generating a notification based on the severity code added to the data record.

13. The system of claim 9, wherein the at least one event represents at least one of a network failure, an operation error, a network outage, or an application error.

14. The system of claim 9, wherein the network is associated with a client that operates the network, and with at least one vendor that maintains at least a portion of the network.

15. The system of claim 14, wherein the information added to the at least one data record comprises contact information for at least one of the client or the at least one vendor, and wherein automatically responding to the events comprises contacting at least one of the client or the at least one vendor using respective contact information.

16. The system of claim 9, wherein the at least one source comprises at least one of a secondary network, an application on a remote computer, or an operating system on a remote computer.

* * * * *

UNITED STATES PATENT AND TRADEMARK OFFICE
CERTIFICATE OF CORRECTION

PATENT NO.        : 8,799,722 B2
APPLICATION NO.   : 13/671967
DATED             : August 5, 2014
INVENTOR(S)       : Scott E. Neuhaus et al.

Page 1 of 1

It is certified that error appears in the above-identified patent and that said Letters Patent is hereby corrected as shown below:

On the Title page, item (72) line 1, "Inventors: Scott E. Neuhaus, Jacsonville, FL (US);" should read --Inventors: Scott E. Neuhaus, Port Washington, WI (US), deceased;--

In the Claims

In claim 1, col. 18, line 47, "identifying at least one event events in the network," should read --identifying at least one event in the network,--

Signed and Sealed this
Twenty-first Day of October, 2014

Michelle K. Lee
*Deputy Director of the United States Patent and Trademark Office*